United States Patent [19]
Akaiwa

[11] Patent Number: 4,652,699
[45] Date of Patent: Mar. 24, 1987

[54] VOICE SCRAMBLER USING FREQUENCY-INVERSION AND BAND-SPLITTING TECHNIQUE

[75] Inventor: Yoshihiko Akaiwa, Tokyo, Japan

[73] Assignee: NEC Corporation, Tokyo, Japan

[21] Appl. No.: 746,425

[22] Filed: Jun. 19, 1985

[30] Foreign Application Priority Data

Jun. 29, 1984 [JP] Japan .................................. 59-134316

[51] Int. Cl.⁴ ............................................. H04M 1/70
[52] U.S. Cl. ........................................ 380/31; 380/39
[58] Field of Search ............... 179/1.5 M, 1.5 R, 1.5 S, 179/1.5 FS; 178/22.04; 455/26, 28; 375/2.1

[56] References Cited

U.S. PATENT DOCUMENTS

| | | | |
|---|---|---|---|
| 1,819,614 | 8/1931 | Mathes | 179/1.5 R |
| 3,124,748 | 3/1964 | Webb, Jr. | 179/1.5 S |
| 3,201,517 | 8/1965 | Gannett | 179/1.5 S |
| 4,068,094 | 1/1978 | Schmid et al. | 179/1.5 S |
| 4,278,840 | 7/1981 | Morgan et al. | 179/1.5 R |
| 4,308,617 | 12/1981 | German, Jr. | 455/26 |
| 4,397,034 | 8/1983 | Cox et al. | 455/26 |
| 4,443,660 | 4/1984 | De Long | 179/1.5 R |
| 4,516,078 | 5/1985 | Yanagihara et al. | 455/26 |

*Primary Examiner*—Salvatore Cangialosi
*Assistant Examiner*—Aaron J. Lewis
*Attorney, Agent, or Firm*—Sughrue, Mion, Zinn, Macpeak, and Seas

[57] ABSTRACT

A spectrum inversion type voice scrambler for secret speech communication comprises a first spectrum inversion section, a second inversion section and an adder for summing the outputs of the first and second inversion sections. A random signal generator produces two random signals for controlling, respectively, the spectrum inversion in the two inversion sections. The first inversion section is comprised of a modulator section composed of a variable frequency signal generator response to a random signal, a mixer receiving an input signal and the output of the variable frequency generator. The second inversion section includes three modulator sections the first and third of which are composed of a fixed frequency generator, a mixer and a low pass filter. The second modulator section is composed of a variable frequency generator responsive to the second random signal, a mixer and a low pass filter. The first modulator receives the input signal, while the third modulator has its output connected to the adder which also receives the output of the first spectrum inversion section. By the above arrangement only one type of filter, a low pass filter, is needed.

1 Claim, 7 Drawing Figures

VOICE SCRAMBLER USING FREQUENCY-INVERSION AND BAND-SPLITTING TECHNIQUE

BACKGROUND OF THE INVENTION

This invention relates to a voice scrambling apparatus for keeping speech communication secret and, more particularly, to a voice scrambler using a frequency-inversion and band-splitting technique. Among conventional voice scramblers, the spectrum inversion scrambler which performs the inversion and rolling of a voice spectrum within a certain frequency band, is most widely used since it can achieve such voice scrambling with high voice quality and less delay time. Examples of such a voice scrambler are disclosed in U.S. Pat. Nos. 4,068,094 and 4,278,840. However, each of these conventional scramblers unavoidably requires a considerable number of types of filters for realizing the spectrum inversion as described hereinbelow.

SUMMARY OF THE INVENTION

An object of this invention is, therefore, to provide a voice scrambler operable with only one type of filter to obviate the above-mentioned disadvantages in the prior art systems.

According to one aspect of the invention, there is provided a voice scrambler which comprises a random signal generator for generating a first and a second random signals; a first variable frequency (VF) signal generator for generating a first VF signal in response to the first random signal from said random signal generator; a first mixer for mixing the first VF signal with an input signal to produce a first mixed signal; and a first low-pass filter (LPF) for passing lower frequency components of the first mixed signal. The scrambler is also equipped with a first fixed frequency (FF) signal generator for generating a first FF signal; a second mixer for mixing the first FF signal with the input signal to produce a second mixed signal; a second LPF for passing lower frequency components of the second mixed signal; a second VF signal generator for generating a second VF signal in response to the second random signal from the random signal generator; a third mixer for mixing the second VF signal with the output signal from said second LPF to produce a third mixed signal; and a third LPF for passing lower frequency components of the third mixed signal. The scrambler further comprises a second FF signal generator for generating a second FF signal; a fourth mixer for mixing the second FF signal with the output signal from the third LPF to produce a fourth mixed signal; a fourth LPF for passing lower frequency components of the fourth mixed signal; and an adder for summing up the outputs from said first and fourth LPF's to produce a transmission scrambled signal.

The above and other objects, features and advantages of the present invention will become apparent from the following detailed description when taken with the accompanying drawings in which.

DETAILED DESCRIPTION OF THE EMBODIMENT

Figure 1:
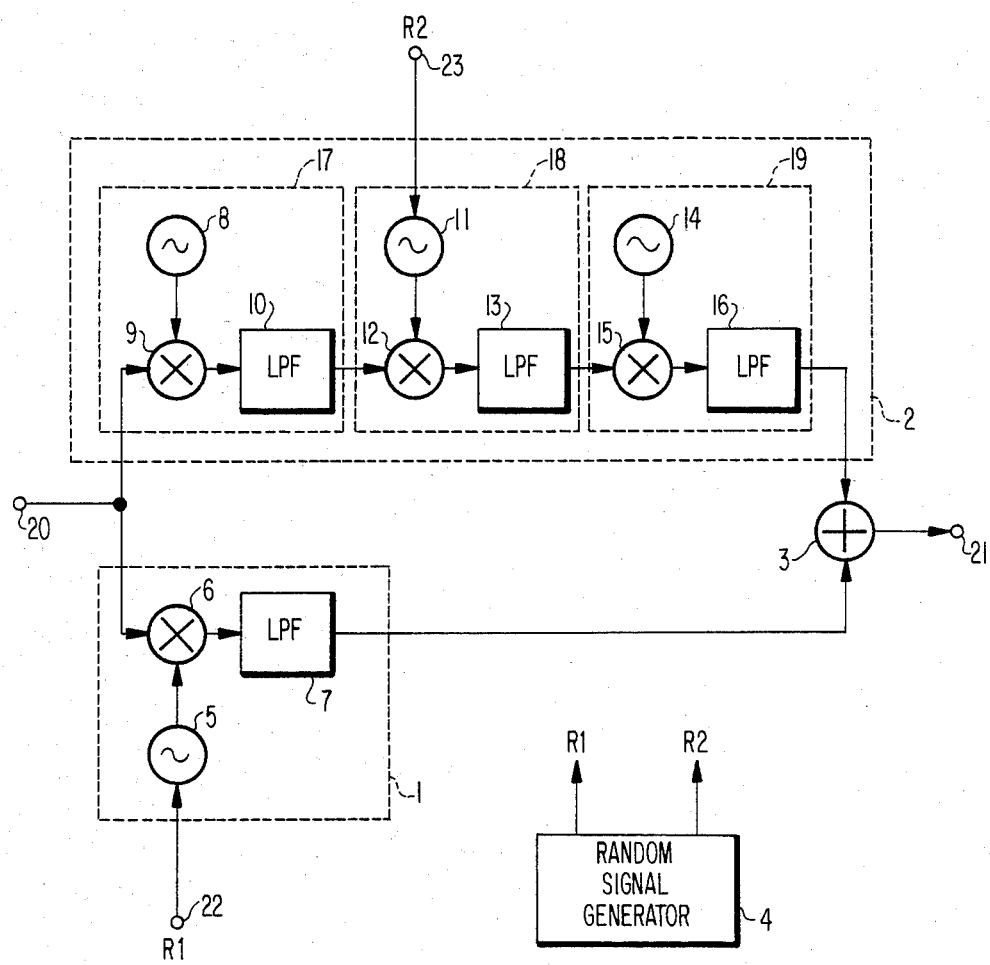
FIG. 1 is a circuit diagram of an embodiment of the invention.

Referring to FIG. 1, an embodiment of the invention comprises a first spectrum inversion section 1, a second spectrum inversion section 2 having three modulators 17 to 19, an adder 3 for summing the outputs from these inversion sections 1 and 2, and a random signal generator 4 for generating two random signals $R_1$ and $R_2$ for controlling spectrum inversion in the inversion sections 1 and 2. The section 1 includes a first variable frequency (VF) signal generator 5 which varies the frequency responsive to the random signal $R_1$, a first mixer 6 for mixing the first VF signal supplied from the generator 5 with an input voice signal fed to a terminal 20 and a first low-pass filter (LPF) 7 for passing the lower frequency components of the output from the mixer 6. The modulator 17 of the section 2, on the other hand, includes a first fixed frequency (FF) generator 8, a second mixer 9 for mixing the input voice signal with the first FF signal given from the generator 8, and a second LPF 10 for passing the lower frequency components of the output from the mixer 9. The modulator 18 is provided with a second VF generator 11 which varies the frequency responsively to the random signal $R_2$ from the generator 4, a third mixer 12 for mixing a second VF signal fed from the generator 11 with the output of the modulator 17, and a third LPF 13 for passing the lower frequency components of the output from the mixer 12. The modulator 19 includes a second FF generator 14, a fourth mixer 15 for mixing the output from the modulator 18 with the signal from the third FF generator 14, and a fourth LPF 16 for passing the lower frequency components of the mixer 15. For details of the random signal generator 4, reference can be made to U.S. Pat. No. 4,115,657.

Figure 2A:
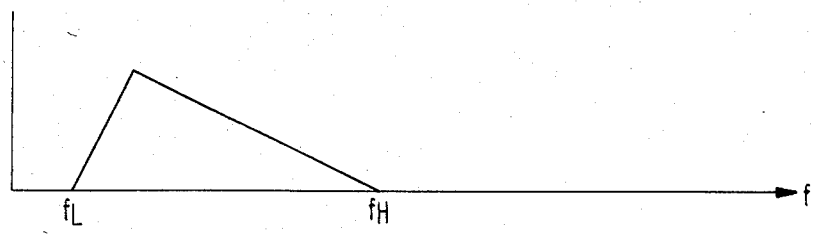
FIGS. 2A through 2F show frequency spectra for describing the operation of the invention.
Figure 2B:
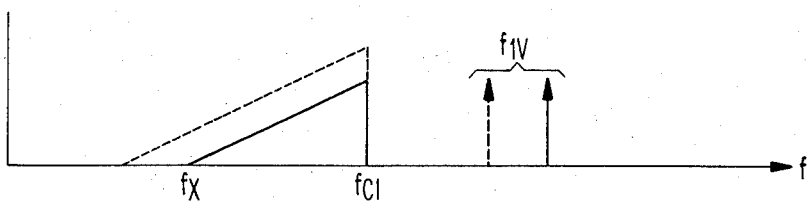
Figure 2C:
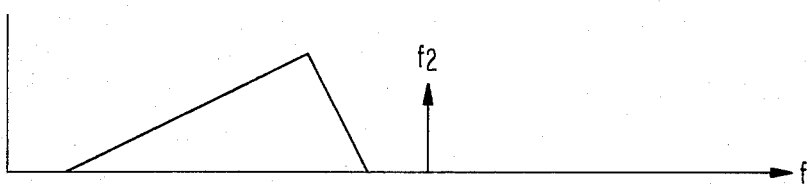
Figure 2D:
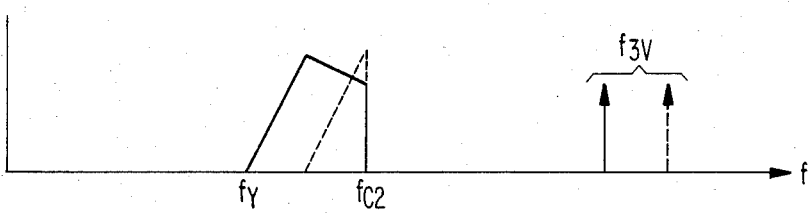
Figure 2E:
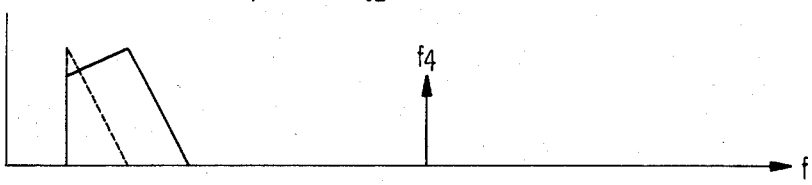

The operation of the embodiment of FIG. 1 will be described in detail with reference to FIGS. 2A to 2F. It is assumed now that an input voice signal supplied to the terminal 20 is limited in the frequency range from $f_L$ to $f_H$ as illustrated in FIG. 2A. In radio communication, $f_L$ is most often 300 Hz while $f_H$ is 3000 Hz. An input voice signal is splitted into two, one of which is mixed by the mixer 6 with a first VF signal $f_{1v}$ of the generator 5. The output of the generator 5 is given to the LPF 7 to obtain the spectrum shown in FIG. 2B. The spectrum is shifted on a frequency axis in response to the frequency change of the VF signal (see FIG. 2B).

Figure 2F:
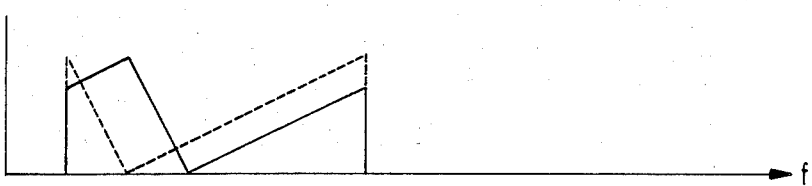

The remaining portion of the splitted input voice signal is mixed by the mixer 9 with the FF signal $f_2$ of the generator 8. The output of the generator 8 is supplied to the LPF 10 to take out the lower side band alone, thereby obtaining the spectrum shown in FIG. 2C. The VF signal of $f_{3v}$ of the generator 11 is mixed by the mixer 12 with the output signal of the LPF 10 whose output is given to the LPF 13 to obtain the spectrum shown in FIG. 2D. The output of the FF generator 14 is mixed by the mixer 15 with the output of the LPF 13. The output of the LPF 13 is fed to LPF 16 to pass the lower side band, thereby obtaining the spectrum shown in FIG. 2E. The adder 3 sums the outputs of the LPF's 7 and 16 to obtain the spectrum at an output terminal 21 as shown in FIG. 2F. The magnitude of the spectrum rolling can be varied by the VF signals $f_{1v}$ and $f_{3v}$ of the generators 5 and 11. The VF signals $f_{1v}$ and $3v$ are determined by the random signals $R_1$ and $R_2$ which are supplied respectively at the control input terminals 22 and 23. The VF signals $f_{1v}$ and $f_{3v}$ must satisfy the following equation (5). Namely, since the sum of the spectrum shown in FIG. 2B and the spectrum shown in FIG. 2D must be equal to the frequency band of the input voice signal shown in FIG. 2A, the following equations (1) to (4) can be established:

$$f_{c1} - f_x + f_{c2} - f_Y = f_H - f_L \quad (1)$$

$$f_x = f_{1v} - f_H \quad (2)$$

$$f_Y = f_{3v} - f_{2H} \quad (3)$$

$$f_{2H} = f_{3v} - f_L \quad (4)$$

where $f_{c1}$ and $f_{c2}$ are the cut-off frequencies of the LPF's 7 and 13.

From the above equations, the following equation (5) can be developed:

$$f_{1v} + f_{3v} = f_{c1} + f_{c2} + f_2 \quad (5)$$

In order to restore the frequency band of the scrambled signal to the frequency band $(f_L - f_H)$ of the original input voice signal, the following equations (6) and (7) should be satisfied.

$$f_{c1} = f_H \quad (6)$$

$$f_4 - f_{c2} = f_L \quad (7)$$

Similarly to the prior-art spectrum inversion scramblers, a demodulator identical to the one shown in FIG. 1 may used for descrambling.

Although the description above is given to the case where this invention is realized by using analog circuits, the scope of the invention is by no means limited to analog circuits but is applicable to digital circuits. More specifically, a digitaized voice signal is supplied to the terminal 20 in FIG. 2. In that case, the mixers 6, 9, 12, and 15 must be replaced with digital mixers, the low pass filters with digital filters, the adder 3 with a digital adder and the generators 5, 8, 11 and 14 with digital sinewave generators. It is obvious from the description in the foregoing that necessary digital signal processing can be easily achieved by means of a microprocessor or the like. This invention enables all the necessary filtering process to be performed by low-pass filtering so as to reduce the development process of programs to be used for the microprocessor. This invention is applicable not only to voice signals but to other signals.

As shown in the above, this invention can reduce the required number of filter types into only one or the low-pass filtering alone, thereby simplifying the structure. Because all the cut-off frequencies of the low-pass filters can be made $f_H$ in the invention, all the filters used can have the same characteristics to further simplify the structure.

What is claimed is:

1. A voice scrambler comprising a random signal generator for generating a first and a second random signals; a first variable frequency signal generator for generating a first variable frequency signal responsive to the first random signal from said random signal generator; a first mixer for mixing the first variable frequency signal with an input signal to produce a first mixed signal; a first low-pass filter for passing lower frequency components of the first mixed signal; a first fixed frequency signal generator for generating a first fixed frequency signal; a second mixer for mixing the first fixed frequency signal with the input signal to produce a second mixed signal; a second low-pass filter for passing lower frequency components of the the second mixed signal; a second variable frequency generator for generating a second variable frequency signal in response to the second random signal from said random signal generator; a third mixer for mixing the second variable frequency signal with the output signal from said second low-pass filter to produce a third mixed signal; a third low-pass filter for passing lower frequency components of the third mixed signal; a second fixed frequency signal generator for generating a second fixed frequency signal; a fourth mixer for mixing the second fixed frequency signal with the output signal from said third low-pass filter to produce a fourth mixed signal; a fourth low-pass filter for passing lower frequency components of the fourth mixed signal; and an adder for summing up the output from said first and fourth low-pass to produce a transmission scrambled signal.

* * * * *